United States Patent [19]

Tani et al.

[11] Patent Number: 4,984,088
[45] Date of Patent: Jan. 8, 1991

[54] EXPOSURE CONTROLLING APPARATUS FOR ELECTRONIC STILL CAMERA

[75] Inventors: Nobuhiro Tani, Tokyo; Harumi Aoki, Saitama, both of Japan

[73] Assignee: Asahi Kogaku Kogyo Kabushiki Kaisha, Tokyo, Japan

[21] Appl. No.: 405,194

[22] Filed: Sep. 11, 1989

Related U.S. Application Data

[63] Continuation-in-part of Ser. No. 248,390, Sep. 23, 1988, Pat. No. 4,868,667, and a continuation-in-part of Ser. No. 381,185, Jul. 18, 1989.

[30] Foreign Application Priority Data

Sep. 25, 1987 [JP] Japan .................. 62-241545

[51] Int. Cl.$^5$ .............................................. H04N 3/14
[52] U.S. Cl. .............................. 358/228; 358/213.19
[58] Field of Search .................... 358/213.19, 213.16, 358/228, 909, 209

[56] References Cited

U.S. PATENT DOCUMENTS

| | | | |
|---|---|---|---|
| 4,635,126 | 1/1987 | Kinoshita | 358/213.19 |
| 4,675,738 | 6/1987 | Okino et al. | 358/167 |
| 4,734,777 | 3/1988 | Okino et al. | 358/213.19 |
| 4,742,369 | 5/1988 | Ishii et al. | 358/228 |
| 4,868,667 | 9/1989 | Tani et al. | 358/228 |

*Primary Examiner*—Stephen Brinich
*Attorney, Agent, or Firm*—Sandler, Greenblum & Bernstein

[57] ABSTRACT

An exposure controlling apparatus provided for an electronic still camera using an imaging device, such as a CCD, controls an exposure with high accuracy even if a low-accuracy external photometric device or a low-accuracy diaphragm mechanism is used. The apparatus includes a first photometric component for metering the brightness of a subject and outputting a first photometric value, and automatic setting component for automatically setting either an aperture value or a shutter speed, depending on the first photometric value, an imaging device having matrix light receiving elements for effecting photoelectric conversion, and an electronic shutter for controlling charge accumulation time, depending on the set shutter speed. A diaphragm component adjusts a bundle of incident rays on a light receiving surface of the imaging device so a set aperture value will be attained, and a second photometric device effects the preliminary photography at an aperture value and shutter speed set by controlling the electronic shutter and the diaphragm component. The total amount of charges accumulated in all, or a predetermined number, of the light receiving elements of the imaging device are detected, and a second photometric value is outputted that is proportional to the total amount of charge. A shutter speed correcting device is provided for correcting exposure error.

15 Claims, 10 Drawing Sheets

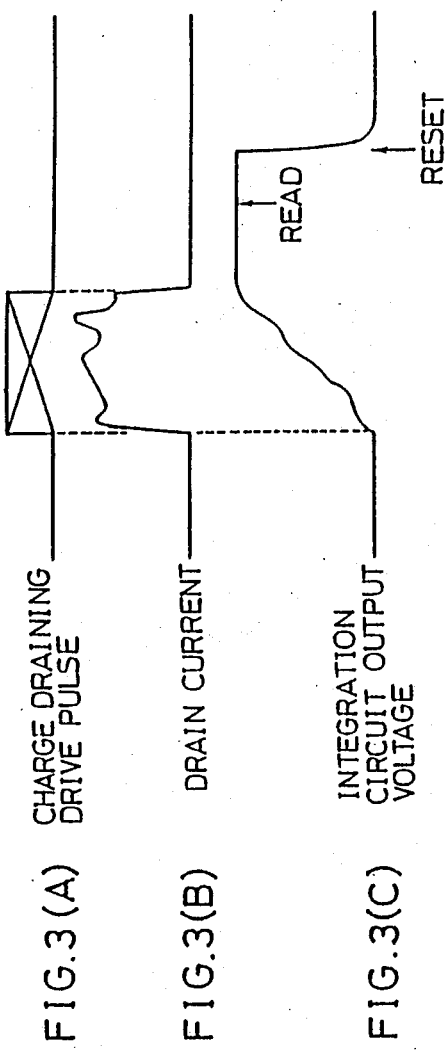

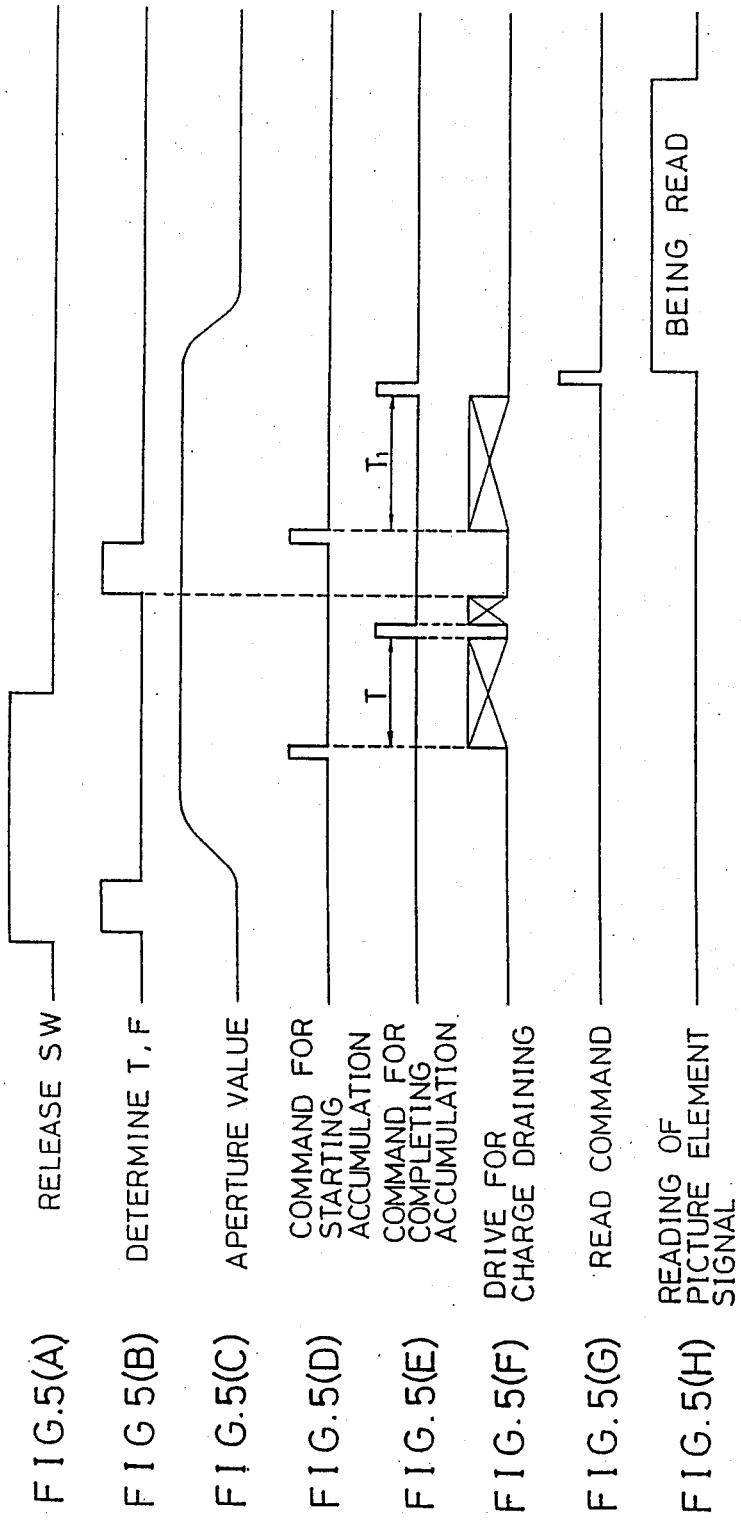

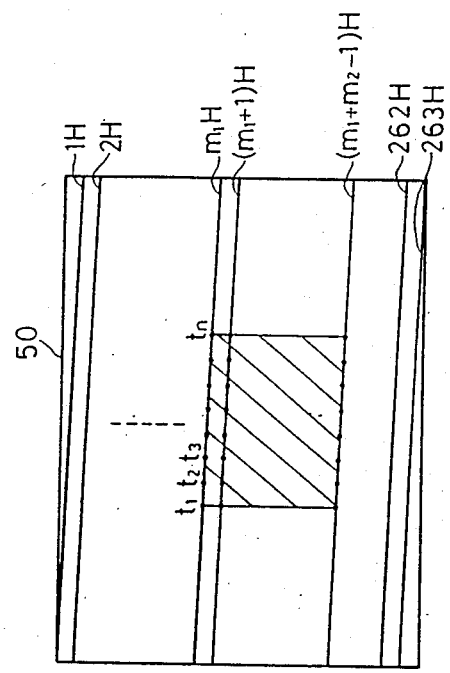
FIG. 9
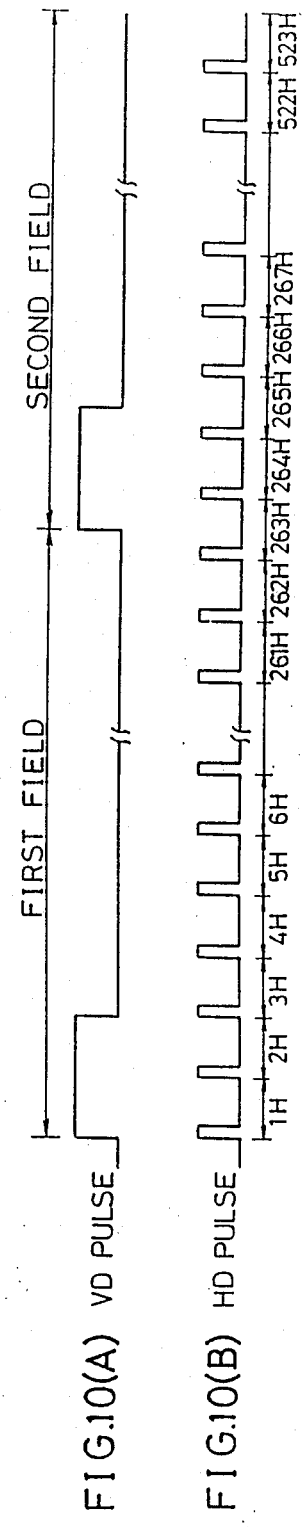
FIG.10(A) VD PULSE
FIG.10(B) HD PULSE

EXPOSURE CONTROLLING APPARATUS FOR ELECTRONIC STILL CAMERA

This application is continuation-in-part of copending application Ser. No. 07/248,390, filed on Sept. 23 1988, now U.S. Pat. No. 4,868,667, issued Sept. 19, 1989, and is a continuation-in-part of copending application Ser. No. 07/381,185, filed on July 18, 1989, both of which are entitled "Exposure Controlling Apparatus for Electronic Still Camera", the disclosures of each being expressly incorporated herein by reference.

BACKGROUND OF THE INVENTION

1. Field of the Invention

The present invention relates to an exposure controlling apparatus for an electronic still camera using an imaging device, such as a CCD (charge-coupled device).

2. Description of Background Information

When using an imaging device such as a CCD, it is necessary to perform exposure control with high accuracy, since its latitude of use is limited in comparison with silver halide film.

Accordingly, it is necessary for an electronic still camera having an imaging device to be provided with a highly accurate external photometric device and a highly accurate diaphragm mechanism.

However, costs increase if highly accurate external photometric devices and diaphragm mechanisms are provided In addition, unless such devices are provided, underexposure and overexposure will result, so that it is impossible to obtain an excellent image.

SUMMARY OF THE INVENTION

Accordingly, an object of the present invention is to provide an exposure controlling apparatus for an electronic still camera which is capable of accurately controlling exposure, even if a low-accuracy external photometric device or a low-accuracy diaphragm mechanism is used.

To this end, according to the present invention, there is provided an exposure controlling apparatus for an electronic still camera, comprising a first photometric means for metering the brightness of a subject and outputting a photometric value thereof as a first photometric value, an automatic setting means for automatically setting either an aperture value or a shutter speed that is not manually set, on the basis of the first photometric value, an imaging device in which light receiving elements for effecting photoelectric conversion are arranged in the form of a matrix, an electronic shutter for controlling a charge accumulation time by the light receiving elements of the imaging device on the basis of the shutter speed as set, a diaphragm means for adjusting a cross-sectional area of a bundle of rays made incident upon a light receiving surface of the imaging device in such a manner that the aperture value as set will be attained, a second photometric means which effects preliminary photographing at the aperture value and the shutter speed (which are both) set by controlling the electronic shutter and the diaphragm means, detecting a total amount of charges accumulated in all or part of the light receiving elements in a predetermined region thereof, outputting a value proportional to the total amount of charges as a second photometric value, and a shutter speed correcting means for correcting the shutter speed in such a manner that an exposure attributable to an aperture control deviation and any error of the first photometric value becomes zero by using the second photometric value.

In accordance with the present invention, preliminary photographing is performed on the basis of a first photometric value, and the shutter speed is corrected by using a second photometric value based on this preliminary photographing in such a manner that an exposure error attributable to any error between a diaphragm control deviation and the first photometric value becomes zero. Thus, even if a low-accuracy diaphragm mechanism or a low-accuracy external photometric device is used, it is possible to easily effect a high-accuracy exposure control.

BRIEF DESCRIPTION OF THE DRAWINGS

The foregoing and other objects, features, and advantages of the invention will be apparent from the following more particular description of preferred embodiments as illustrated in the accompanying drawings in which reference characters refer to the same parts throughout the various views. The drawings are not necessarily to scale, emphasis instead being placed upon illustrating the principles of the invention.

1 to 5 relate to a first embodiment of the present invention in which:

FIG. 3 is a waveform diagram illustrating the operation of the internal photometric circuit shown in FIG. 2;

FIG. 5 is a timing chart corresponding to the flowchart of FIG. 4;

FIGS. 8 to 11B relate to a fourth embodiment of the present invention, in which:

FIG. 8 is a block diagram showing essential components of an electronic still camera;

FIG. 9 show sampling points on a plurality of horizontal scanning lines;

FIG. 10(A) is a VD pulse waveform diagram;

FIG. 10(B) is an HD pulse waveform diagram; and

FIGS. 11A and 11B are flowcharts showing processing steps executed by the electronic still camera of the fourth embodiment.

DESCRIPTION OF THE PREFERRED EMBODIMENTS

Referring now to the accompanying drawings, a description will be given of the various embodiments of the present invention.

Embodiment 1

Figure 1:
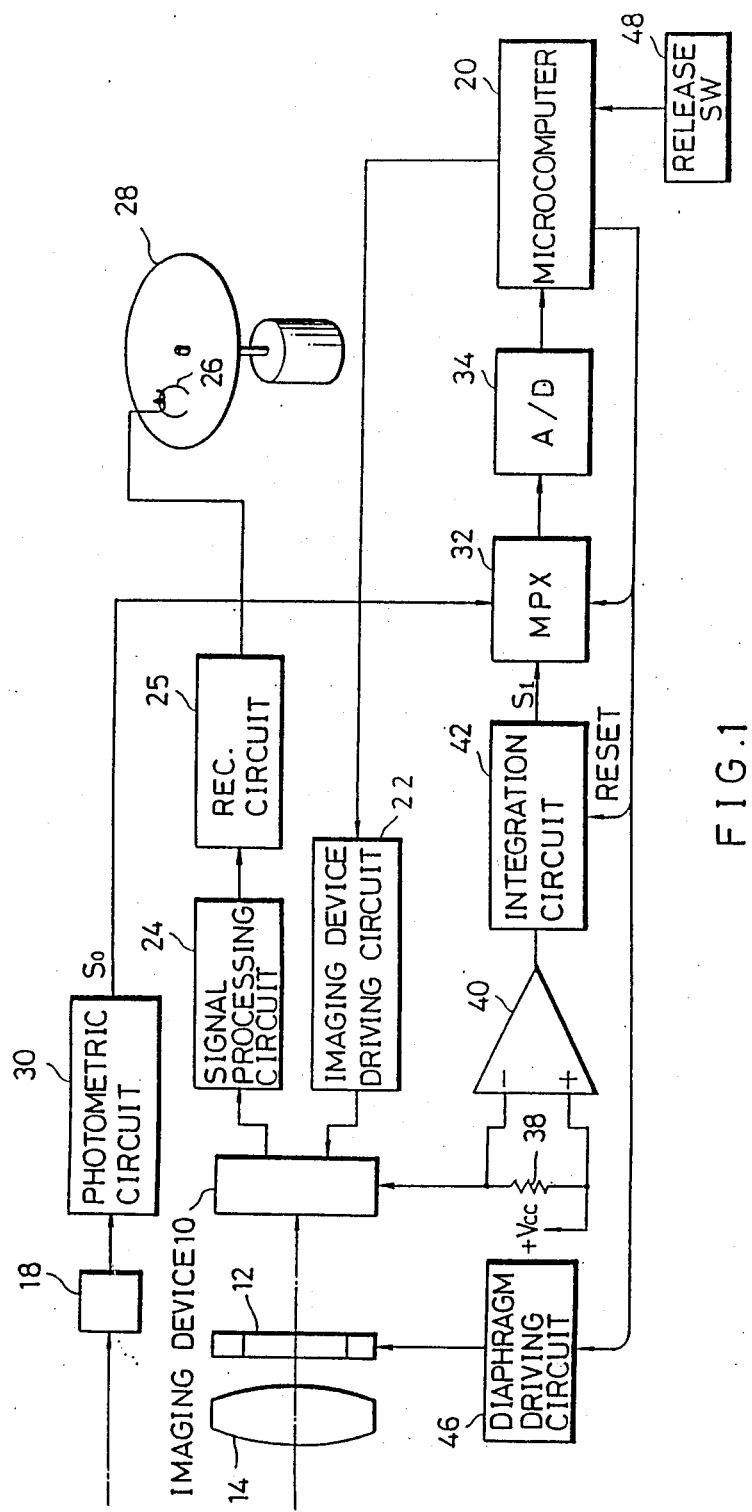
FIG. 1 is a block diagram illustrating essential components of an electronic still camera to which the present invention is applied.

FIG. 1 illustrates the essential portions of an electronic still camera to which the present invention is directed.

A photographic lens 14 is disposed in front of an imaging device 10, such as a CCD, via a diaphragm 12. In addition, a photometric device 18 is disposed above the diaphragm 12.

Signal charges accumulated in light-receiving elements of the imaging device 10 are consecutively obtained as picture element signals on the basis of drive signals supplied from an imaging element driving circuit 22 in accordance with a control command from a microcomputer 20, which are then supplied to a signal processing circuit 24. In the signal processing circuit 24, the picture element signals are subjected to various types of processing and are converted into composite color video signals. The composite color signals are frequency-modulated by a recording circuit 25 and supplied to a magnetic head 26. Subsequently, signals for one image are recorded at one predetermined track of the magnetic disk 28.

Meanwhile, signals subjected to photoelectric conversion by the photometric device 18 are supplied to a photometric circuit 30. The photometric device 18 and the photometric circuit 30 constitute an exposure meter. The photometric circuit 30 amplifies the photoelectrically converted signals, and subjects an external photometric value, which is substantially proportional to a subject brightness B, to a logarithmic compression and outputs the result. In this embodiment, it is assumed that the accuracy of the photometric device is low. The logarithmically compressed value of this external photometric value $S_0$ is digitized by an analog to digital converter (A/D) 34, via a multiplexer 32, and then read by a microcomputer 20.

Figure 2:
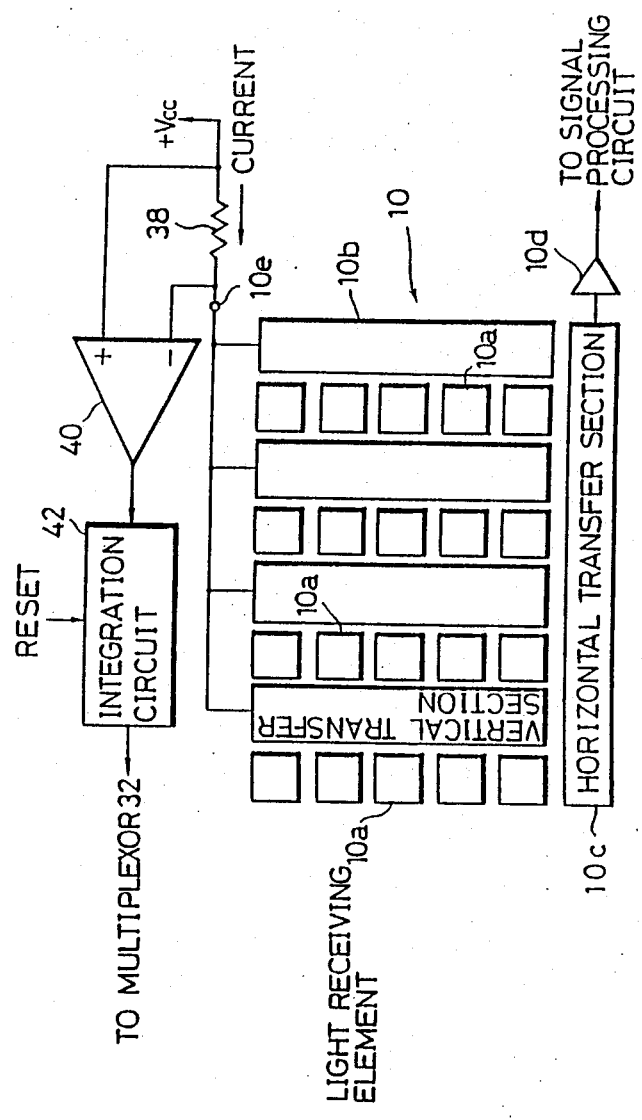
FIG. 2 is a block diagram of an internal photometric circuit, wherein an imaging device comprises a CCD.

If the imaging device 10 is an interline CCD imaging device, the imaging device 10 comprises a plurality of light receiving elements 10a, a plurality of vertical transfer sections 10b, a horizontal transfer section 10c, and an amplifier 10d, which are interconnected in a known manner, as shown in FIG. 2. In the drawing, a positive supply voltage is applied to a drain terminal 10e via a resistor 38.

If a transfer gate (not shown) is placed between the light receiving elements 10a and each of the vertical transfer sections 10b to transfer charges accumulated in the light receiving elements 10a to the vertical transfer sections 10b, and the transfer gates are then closed and if the vertical transfer sections 10b are driven so as to be transferred at a high speed in an opposite direction to the horizontal transfer section 10c side, i.e., driven to drain charges (FIG. 3(A)), negative charges of a sum of the picture element signals in each horizontal line are consecutively allowed to flow through the resistor 38 via the drain terminal 10e (FIG. 3(B)). An inter-terminal voltage of the resistor 38 is detected and amplified by a differential amplifier 40, which is then integrated by an integration circuit 42 (FIG. 3(C)).

As shown in FIG. 1, the integrated value is supplied to an A/D converter 34, via the multiplexer 32, as an internal photometric value $S_1$ which is digitized and read by the microcomputer 20.

In accordance with a programmed automatic exposure (AE) system, the microcomputer 20 determines an aperture value F and a shutter speed T on the basis of the external photometric value $S_0$, and controls the amount of opening of the diaphragm 12, via a diaphragm driving circuit 46, in such a manner that the aperture value F is obtained. The diaphragm control is of an open-loop control type, and since a low-accuracy and inexpensive diaphragm mechanism is used, the control deviation is large, so that a required latitude cannot be met. With respect to the shutter speed, since an electronic shutter based on the driving of the imaging device 10 is employed, its control deviation can be neglected.

The microcomputer 20 performs a series of various types of processing when a release switch 48 is operated.

On the basis of FIGS. 4(A) and 4(B), the operation of the embodiment having the above-described arrangement will be described with reference to FIG. 3 and FIGS. 5(A) to 5(H).

Figures 4A, 4B:
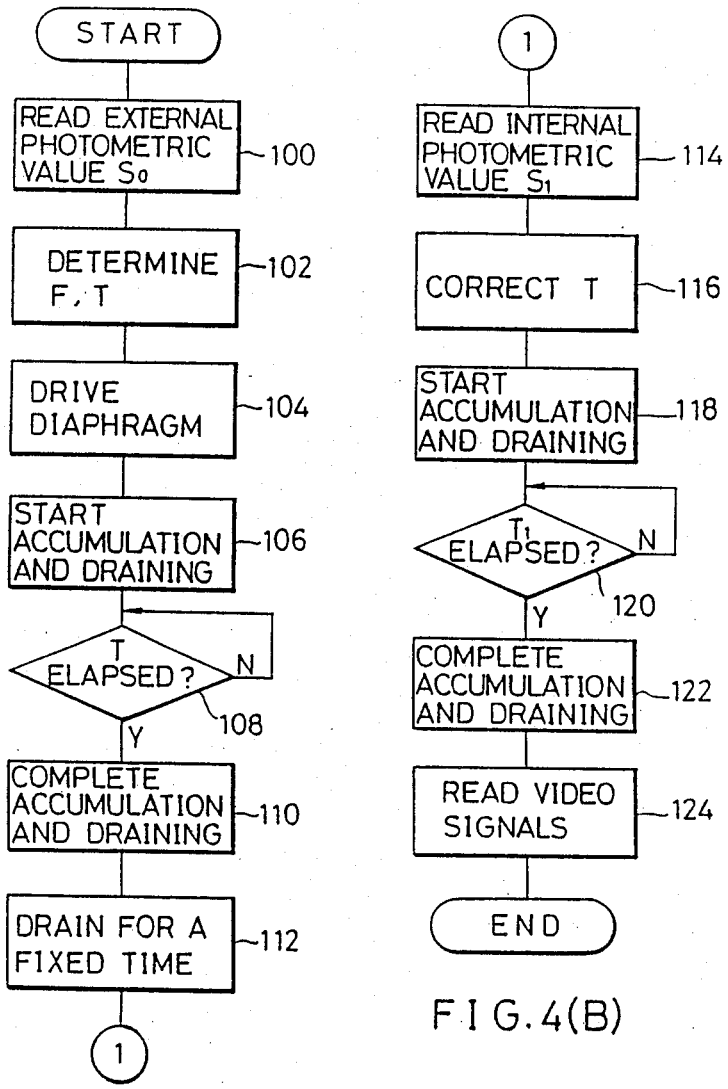
FIGS. 4A and 4B illustrate flowcharts showing the flowchart processing steps executed by a microcomputer associated with the still camera of the first embodiment.

FIGS. 4(A) and 4(B) are flowcharts corresponding to a program executed by the microcomputer 20, its processing procedure corresponding to the timing charts shown in FIGS. 5(A) to 5(H).

If a photographer directs the photographic lens 14 toward a subject and operates the release switch 48 (FIG. 5(A)), a release signal is supplied to the microcomputer 20. This starts the execution of the program shown in FIGS. 4(A) and 4(B). Incidentally, the diaphragm 12 is initially set in an open state.

In Step 100 (FIG. 4(A)), a logarithmically compressed value of the external photometric value $S_0$ is read. Then, in Step 102, the aperture value F and the shutter speed T are determined from Formula (1), below, and a relationship between the aperture value F and the shutter speed T in the programmed AE system:

$$K = \alpha BTC/F^2 \tag{1}$$

where K represents an appropriate exposure amount (constant), $\alpha$ represents a proportional constant, B represents subject brightness, and C represents the sensitivity of the imaging device 10. The subject brightness B is determined by Formula (2):

$$B = \beta S_0 \tag{2}$$

where $\beta$ is a proportional constant.

Actually, however, since the subject brightness B is not precisely proportional to the external photometric value $S_0$, the subject brightness B contains an error. Accordingly, the targeted shutter speed T and the targeted aperture value F, determined by Formula (1), are not appropriate values. An accurate subject brightness will be referred to below as $B_0$.

In Step 104, the diaphragm 12 is driven via a diaphragm driving circuit 46 (FIG. 1) so that the targeted aperture value F will be obtained (FIG. 5(C)). As a result, the aperture value becomes a value $F_1$, which is close to the targeted value F.

Then, in Step 106, a command for starting accumulation is supplied to an imaging element driving circuit 22 (FIG. 5(D)). As a result, the transfer gates between the light receiving elements 10a and each of the vertical transfer sections 10b are opened, and the accumulated charges are transferred to the vertical transfer sections 10b. Subsequently, the transfer gates are closed, and charge signals corresponding to the brightness and chromaticity of the subject begin to be accumulated. In other words, the electronic shutter is opened. In addition, a resetting command is supplied to the imaging device driving circuit 22 to start the above-described draining of charges, and the accumulated charges are drained from the imaging device 10 at a high rate of speed (FIG. 5(F)). Then, in Step 108, the shutter speed T (exposure time T), determined in Step 102, is allowed to elapse.

Subsequently, the operation proceeds to Step 110, where a command for stopping the charge draining is supplied to the imaging device driving circuit 22. As a result, the draining of charges from the vertical transfer sections 10b are stopped. A command for completing accumulation is then supplied to the imaging device driving circuit 22 (FIG. 5(E)). Consequently, the transfer gates are opened, and after the charges accumulated in the light receiving elements 10a are transferred to the vertical transfer sections 10b, the transfer gates are closed. Next, in Step 112, a command for draining charges is supplied to the imaging device driving circuit 22, and the driving of charge draining is performed for a fixed time (based on "the number of picture elements of the imaging device" ÷ "the driving frequency for charge draining") (FIG. 5(F)). As a result, a drain current, such as the one shown in FIG. 3(B), flows through the resistor 38. The current value is converted into a voltage value and amplified by the differential amplifier 40 and integrated by integration circuit 42. Then, in Step 114, the microcomputer 20 switches the multiplexer 32 to the integration circuit 42 side, reads the integral value which represents the internal photometric value $S_1$, and resets the integration circuit 42.

In Step 116, the shutter speed T, determined in Step 102, is corrected to $T_1$ in such a manner that an appropriate exposure amount K will be obtained at an aperture value $F_1$. If an exposure error is assumed to be $\Delta K$, the following Formula holds:

$$K + \Delta K = B_0 T C / F_1^2 \quad (3)$$

$$K = B_0 T_1 C / F_1^2 \quad (4)$$

The exposure error $\Delta K$ includes an exposure error that occurs at the time when B is replaced by $B_0$, i.e., an exposure error based on an external photometric error, and an exposure error based on a diaphragm control deviation. From these Formulae, the following can be obtained:

$$T_1 = T/1(1 + \Delta K/K) \quad (5)$$

Meanwhile, the relationship between the internal photometric value $S_1$ and the exposure amount is expressed by the following Formula:

$$K + \Delta K = \lambda S_1 \quad (6)$$

where $\lambda$ is a proportional constant. The values of K and $\lambda$ are written into a read only memory (ROM) associated with the microcomputer 20. Thus, the exposure error $\Delta K$ is determined from Formula (6), and the corrected shutter speed $T_1$ is determined from Formula (5).

In Steps 118-122, the exposure is effected at shutter speed $T_1$, at aperture value $F_1$ (FIGS. 5(D) to 5(F)). This processing is the same as that performed in Steps 106 to 110 with the exception of the exposure time $T_1$.

Thus, even if the accuracy of the external photometric device or the diaphragm mechanism, or both are low, it is possible to accurately perform an exposure control operation.

In Step 124, a read command is supplied to the imaging device driving circuit 22 (FIG. 5(G)), and picture element signals are fetched consecutively from the imaging device 10 (FIG. 5(H)). After these picture element signals are processed by the signal processing circuit 24 and subjected to frequency modulation, composite color video signals are recorded at a predetermined track of the magnetic disk 28.

Embodiment 2

Figure 6:
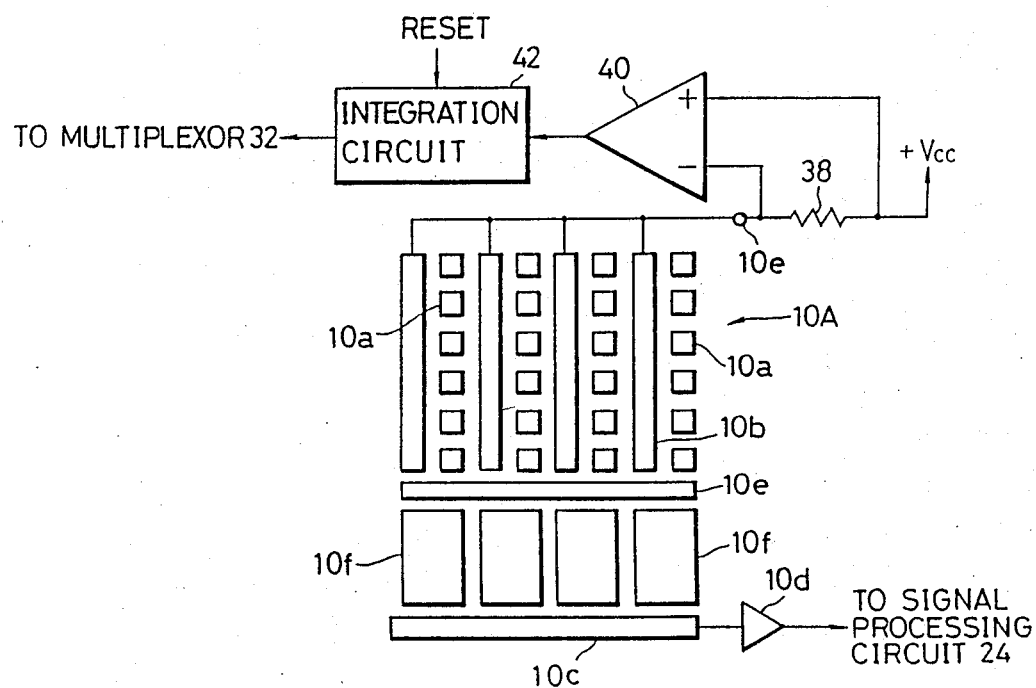
FIG. 6 is a block diagram of an internal photometric circuit used in a second embodiment of the present invention.

A description will now be given of a second embodiment of the present invention with reference to FIG. 6.

In the second embodiment, a frame interline transfer CCD imaging device 10A is used instead of the interline CCD imaging device 10. In the drawing, reference numeral 10e denotes a transfer gate, and reference numeral 10f denotes a storage section. Charge draining driving is similar to the case of the first embodiment.

Embodiment 3

Figure 7:
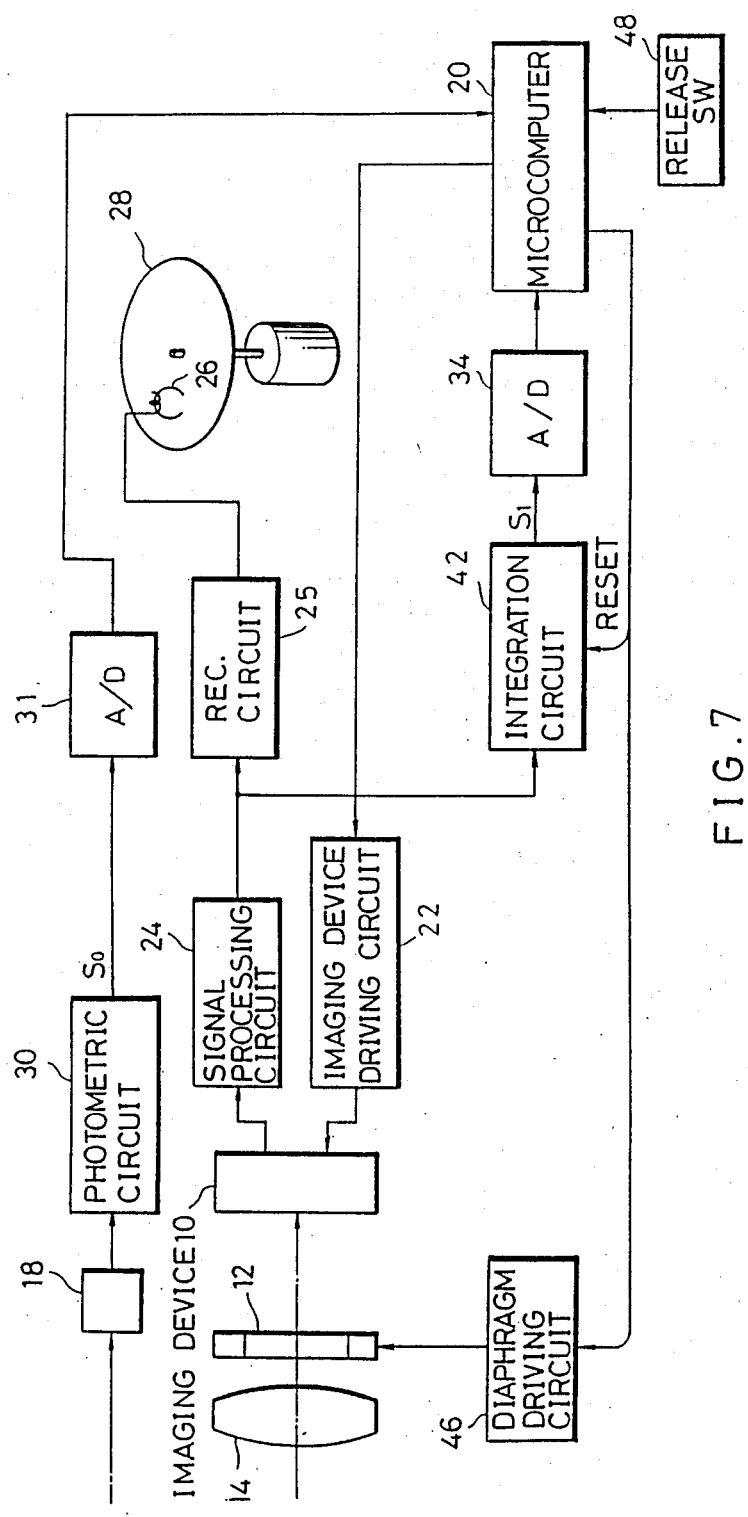
FIG. 7 is a block diagram illustrating essential components of an electronic still camera in accordance with a third embodiment of the invention.

A third embodiment of the invention will now be described with reference to FIG. 7.

In this embodiment, the internal photometric value $S_1$ is obtained by a method which is different from that of the first embodiment. Brightness video signals, included in the composite video signals output from the signal processing circuit 24, are supplied to the integration circuit 42, time-integrating the brightness signals corresponding to one field. This integrated value is used as the internal photometric value $S_1$, as in the first embodiment. Furthermore, instead of using the multiplexer 32 shown in FIG. 1, a second A/D converter 31 is used. The output of the integration circuit 42 is supplied directly to the A/D converter 34, while the output of the photometric circuit 30 is supplied to the A/D converter 31. The output of both A/D converters 31 and 34 are supplied to the microcomputer 20. The other aspects of this embodiment are identical to those of the first embodiment.

Sampling may also be performed on the brightness signals with respect to a part of one field using a synchronizing signal output from the signal processing circuit, integrating the sampling result by means of the integrating circuit 42.

Embodiment 4

Figure 8:
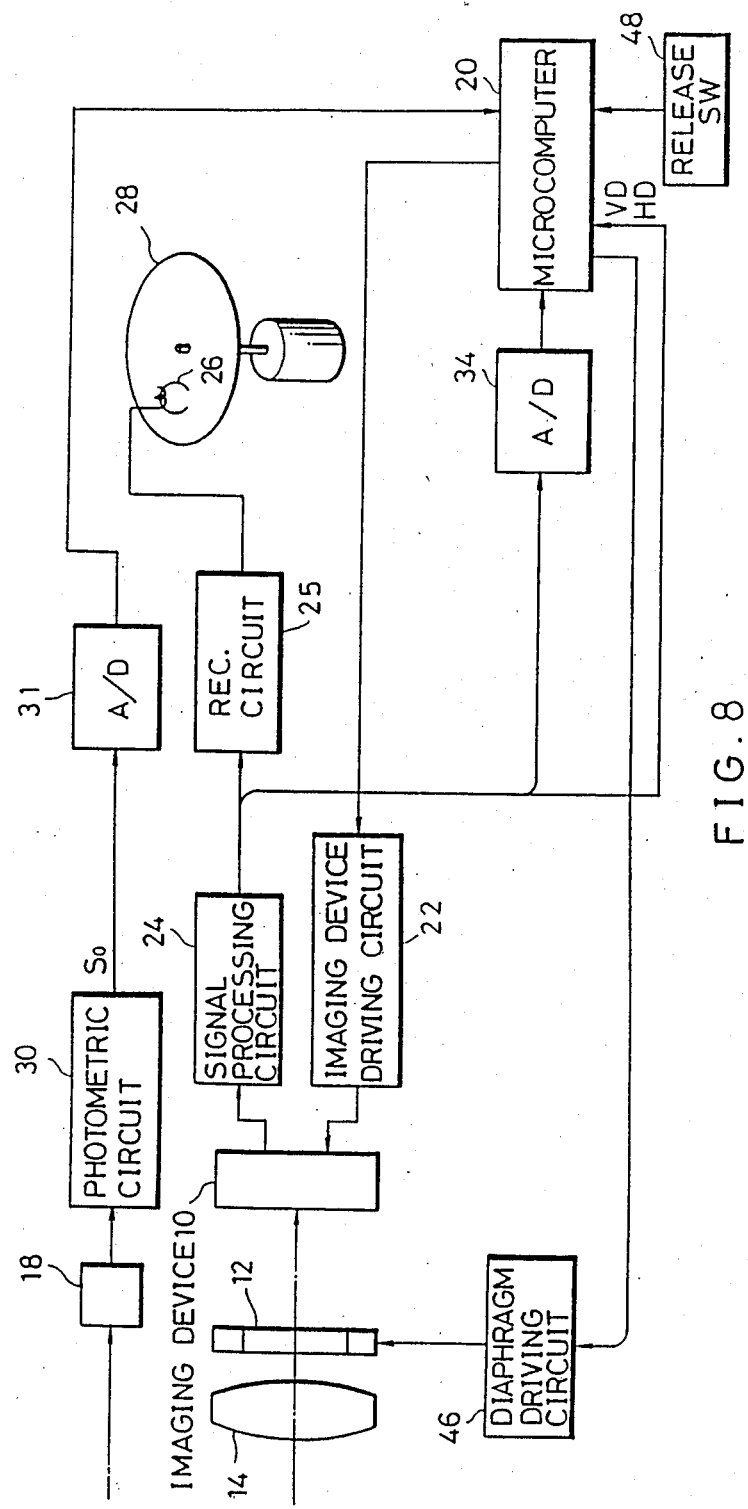

A fourth embodiment of the present invention will now be described with reference to FIGS. 8 to 11B. The method of obtaining the photometric value $S_1$ is different from that disclosed in the third embodiment. As shown in FIG. 8, outputted from the signal processing circuit 24, are supplied through A/D converter 34 to the microcomputer 20. During this process, VD and HD pulses (which are shown in FIGS. 10 (A) and 10(B)) are supplied from the signal processing circuit 24 to the microcomputer 20.

The microcomputer 20 performs brightness data sampling using a screen 50, having horizontal scan lines 1 to 263H which make up one field, as shown in FIG. 9. Sampling is performed on points in the respective middle sections of the scanning lines $m_1$ to $(m_1 + m_2 - 1)H$, i.e., $n \cdot m_2$ points in total (the points in the area indicated by the shaded portion), using a value proportional to the sum total of the brightness data obtained as the internal photometric value $S_1$. The points $t_1, t_2, t_3 \ldots t_n$, shown in FIG. 9 represent the sampling points on the horizontal scan line $M_1H$. The time needed for one horizontal scanning is 63.5 microseconds ($\mu$s).

Figures 11A, 11B:
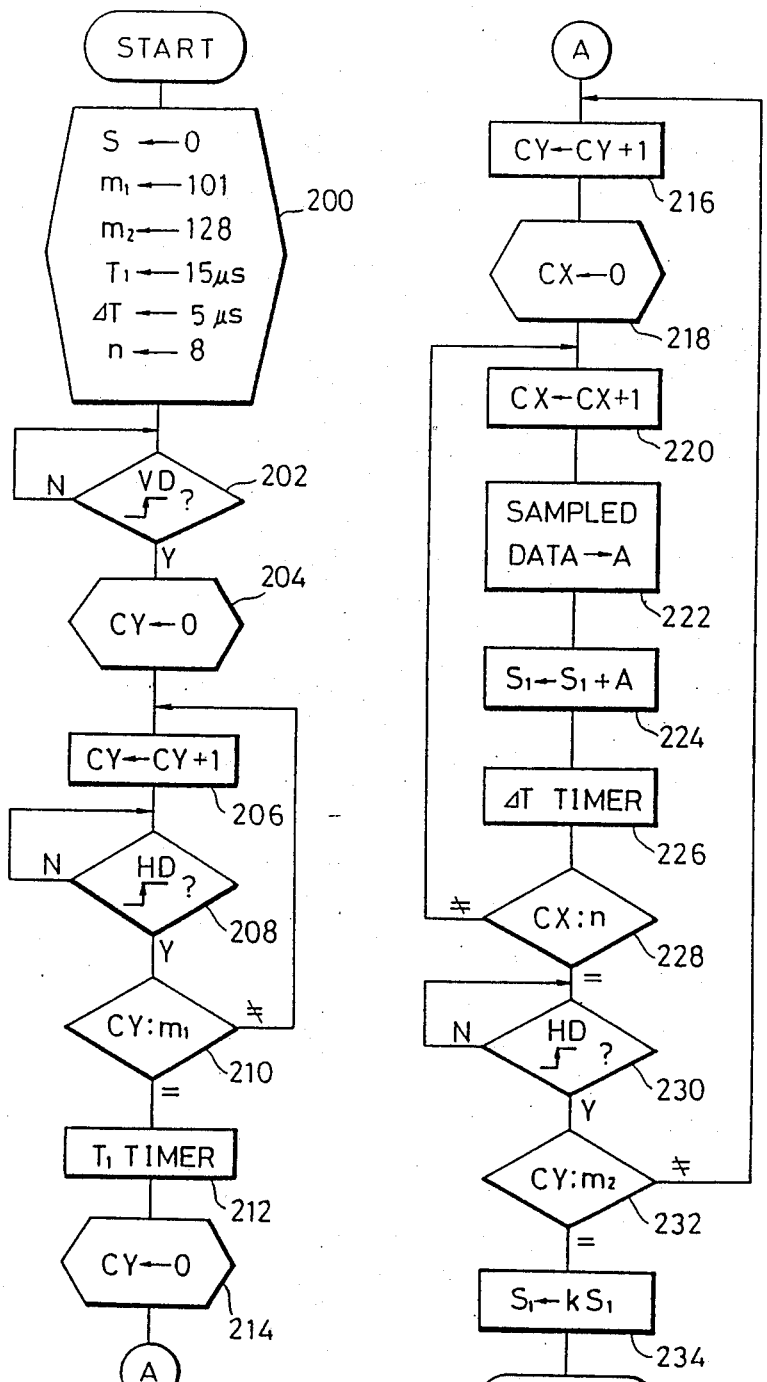

The operation of this process will now be described in detail with reference to FIGS. 11A and 11B.

In Step 200, the values of $S_1$, $m_1$, $m_2$, $T_1$, $\Delta T$ and n are set, for example, to 0, 101, 128, 15 $\mu$s, 5 $\mu$s and 8, respectively. $T_1$ and $\Delta T$ represent the setting time for a software timer. In Step 202, processing waits until the VD pulse rises (also known as being a high level). In Step 204, HD pulse counter CY is set to 0. In Steps 206 to 210, the number of high level HD pulse is counted. When the counted value CY has become equal to $m_1$, a delay of $T_1$ on the software timer occurs (Step 212).

In Step 214, the HD pulse counter CY is reset to 0. In Steps 216 and 218, the pulse counter CY is incremented by 1 and sampling counter CX is set to 0. In Steps 220-222, the sampling counter CX is incremented by 1, brightness data is read from the A/D converter 34 and locked into a Register A. In Step 224, the value stored in Register A is added to the $S_1$ value. In Step 226, the time delay $\Delta T$ occurs, by means of a software timer, before proceeding to Step 228, wherein the value of CX is checked. If the value of CX is not equal to n, processing returns to Step 220. By repeating Steps 220-228, sampling of the brightness data for n points is effected, the sum total thereof corresponding to the $S_1$ value.

When the value of CX is equal to n, processing goes to Step 230, wherein processing waits until the HD pulse becomes high. In Step 232, a check is made as to whether the CY value is equal to $m_2$. If the CY value is not equal to $m_2$, processing returns to Step 216. By repeating Steps 216-232, sampling is performed on the brightness signals with respect to n·$m_2$ points in the shaded portion of FIG. 9, the sum total thereof corresponding to the $S_1$ value.

When the value of CY is equal to $m_2$, processing goes to Step 234, wherein the $S_1$ value is multiplied by a constant k, which is then stored as a new value $S_1$, thereby obtaining the internal photometric value $S_1$.

While the invention has been particularly shown and described with reference to the various embodiments thereof, it will be understood that by these skilled in the act that various alterations in form and detail may be made therein without departing from the spirit and scope of the invention. For example, another type of imaging device, other than a CCD, may be used as the imaging device.

Additionally, in the above-described embodiments, a description has been given of a case in which a programmed AE (i.e., automatic exposure) system is employed. The present invention is not restricted to such a system, and shutter-speed-priority systems or diaphragm-priority systems may be adopted. If a shutter-speed-priority system is adopted, the shutter speed is corrected in such a manner that the exposure error becomes zero.

Also, in the foregoing embodiments, a description has been given of a case in which both external photometry and internal photometry are performed. However, an arrangement may be alternately provided wherein only internal photometry is performed. In this case, the initial internal photometry is set, the diaphragm is set to an open state, the shutter speed is set to a predetermined speed, and photometry is effected by using the component elements 10, 38, 40, and 42 shown in FIG. 1.

Moreover, in the above-described embodiments, a description has been given of a case in which correction is carried out once. However, the present invention may also be arranged such that correction is carried out a plurality of times to allow the exposure error to converge to zero.

What is claimed is:

1. An exposure controlling apparatus for an electronic still camera, comprising:

means for metering the brightness of a subject and for outputting a photometric value thereof as a first photometric value;

means for automatically setting either an aperture value or a shutter speed that is not manually set, on the basis of said first photometric value;

an imaging device having a plurality of light receiving elements for effecting photoelectric conversion which are arranged in the form of a matrix;

an electronic shutter for controlling a charge accumulation time by said light receiving elements of said imaging device on the basis of said shutter speed as set;

means for adjusting a cross-sectional area of a bundle of rays incident upon a light receiving surface of said imaging device in such a manner that a set aperture value will be attained;

means for effecting preliminary photographing at said aperture value and said shutter speed set by controlling said electronic shutter and said adjusting means, for detecting a total amount of charge accumulated in at least a part of said light receiving elements of said imaging device, and for outputting a value that is proportional to said total amount of charge as a second photometric value; and means for correcting said shutter speed in such a manner that an exposure error attributable to an aperture control deviation and any error in said first photometric value becomes zero by using said second photometric value.

2. An exposure controlling apparatus according to claim 1, wherein said means for effecting preliminary photographing comprises:

means for draining said charge accumulated in said light receiving elements;

a resistor through which said drained charges are allowed to pass;

an amplifier for amplifying an inter-terminal voltage of said resistor; and an integrator for integrating an output of said amplifier and outputting an integral value thereof as said second photometric value.

3. An exposure controlling apparatus according to claim 1, wherein said means for effecting preliminary photographing comprises:

a signal processing circuit for processing signals outputted from said imaging device so as to extract brightness signals therefrom; and a integrator for time-integrating said brightness signals with respect to at least a part of one field so as to output a value proportional to an integrated value obtained as said second photometric value.

4. An exposure controlling apparatus accoring to claim 1, wherein said means for effecting a preliminary photographing comprises:

a signal processing circuit for processing signals outputted from said imaging device so as to extract brightness signals therefrom;

an A/D converter for converting said brightness signals into digital values; and means for performing sampling of the output of said A/D converter with respect to at least a part of one field thereof so as to output a value that is proportional to the sum total of said sampling result as said second photometric value.

5. An exposure controlling apparatus according to claim 4, wherein at least a part of one field comprises a central portion of said field.

6. An exposure controlling apparatus according to claim 1, wherein said means for metering the brightness of a subject comprises:
   a photometric device for effecting photometric conversion; and
   a photometric circuit for subjecting an output of said photometric device to a logarithmic compression after said output has been amplified.

7. An exposure controlling apparatus according to claim 2, wherein said means for adjusting a cross-sectional area of a bundle of rays comprises a diaphragm and wherein said means for metering the brightness of a subject sets said diaphragm to an open state, effecting additional photographing prior to said preliminary photographing by setting said shutter speed to a predetermined speed, and outputting a value thereof as said first photometric value by using said second photometric means.

8. An exposure controlling apparatus according to claim 3, where in said means for metering the brightness of a subject comprises:
   a photometric device for effecting photometric conversion; and
   a photometric circuit for subjecting an output of said photometric device to a logarithmic compression after said output has been amplified.

9. An exposure controlling apparatus according to claim 4, wherein said means for metering the brightness of a subject comprises:
   a photometric device for effecting photometric conversion; and
   a photometric circuit for subjecting an output of said photometric device to a logarithmic compression after said output has been amplified.

10. An exposure controlling apparatus according to claim 5, wherein said first photometric means comprises;
    a photometric device for effecting photometric conversion; and
    a photometric circuit for subjecting an output of said photometric device to a logarithmic compression after said output has been amplified.

11. An exposure controlling apparatus according to claim 1, wherein said automatic setting means automatically sets said aperture value and said shutter speed in accordance with a programmed AE system by using said first photometric value.

12. An exposure controlling apparatus according to claim 1, wherein said automatic setting means automatically sets said aperture value in accordance with a shutter-speed-priority system by using said first photometric value.

13. An exposure controlling apparatus according to claim 1, wherein said automatic setting means automatically sets said shutter speed in accordance with a diaphragm-priority system by using said first photometric value.

14. An exposure controlling apparatus according to claim 1, wherein said imaging device comprises an interline CCD imaging device.

15. An exposure controlling apparatus according to claim 1, wherein said imaging device comprises a frame interline transfer CCD imaging device.

* * * * *